(12) United States Patent
Hirschsohn

(10) Patent No.: US 7,594,229 B2
(45) Date of Patent: Sep. 22, 2009

(54) PREDICTIVE RESOURCE ALLOCATION IN COMPUTING SYSTEMS

(75) Inventor: Ian Hirschsohn, Solana Beach, CA (US)

(73) Assignee: NVIDIA Corp., Santa Clara, CA (US)

( * ) Notice: Subject to any disclaimer, the term of this patent is extended or adjusted under 35 U.S.C. 154(b) by 376 days.

(21) Appl. No.: 09/974,521

(22) Filed: Oct. 9, 2001

(65) Prior Publication Data

US 2003/0069916 A1    Apr. 10, 2003

(51) Int. Cl.
G06F 9/46 (2006.01)
G06F 15/16 (2006.01)

(52) U.S. Cl. .................................. 718/104; 709/231

(58) Field of Classification Search ................ 718/104; 709/205, 231; 710/5
See application file for complete search history.

(56) References Cited

U.S. PATENT DOCUMENTS

| | | | | |
|---|---|---|---|---|
| 5,155,854 A * | 10/1992 | Flynn et al. | ............ | 718/104 |
| 5,303,369 A * | 4/1994 | Borcherding et al. | ....... | 718/104 |
| 5,375,208 A * | 12/1994 | Pitot | ............................ | 711/156 |
| 5,553,298 A * | 9/1996 | Merryman et al. | ........... | 718/104 |
| 5,943,242 A | 8/1999 | Vorbach et al. | | |
| 6,021,490 A | 2/2000 | Vorbach et al. | | |
| 6,081,903 A | 6/2000 | Vorbach et al. | | |
| 6,119,181 A | 9/2000 | Vorbach et al. | | |
| 6,338,106 B1 | 1/2002 | Vorbach et al. | | |
| 6,343,333 B1 * | 1/2002 | Matsumoto et al. | .......... | 719/320 |
| 6,356,947 B1 * | 3/2002 | Lutterschmidt | ............. | 709/231 |
| 6,405,299 B1 | 6/2002 | Vorbach et al. | | |
| 6,425,068 B1 | 7/2002 | Vorbach et al. | | |
| 6,480,937 B1 | 11/2002 | Vorbach et al. | | |
| 6,542,998 B1 | 4/2003 | Vorbach et al. | | |
| 6,549,936 B1 * | 4/2003 | Hirabayashi | ................. | 709/205 |
| 6,571,381 B1 | 5/2003 | Vorbach et al. | | |
| 6,697,979 B1 | 2/2004 | Vorbach et al. | | |
| 6,810,433 B1 * | 10/2004 | Nishimaki et al. | ............. | 710/5 |
| 7,003,660 B2 | 2/2006 | Vorbach et al. | | |
| 7,210,095 B1 * | 4/2007 | Mor | .......................... | 715/234 |
| 7,210,129 B2 | 4/2007 | May et al. | | |
| 7,266,725 B2 | 9/2007 | Vorbach et al. | | |
| 7,394,284 B2 | 7/2008 | Vorbach | | |
| 7,434,191 B2 | 10/2008 | Vorbach et al. | | |
| 7,444,531 B2 | 10/2008 | Vorbach et al. | | |
| 2003/0039211 A1 * | 2/2003 | Hvostov et al. | ............. | 370/230 |

* cited by examiner

*Primary Examiner*—Van H Nguyen
*Assistant Examiner*—Camquy Truong
(74) *Attorney, Agent, or Firm*—Patterson & Sheridan, LLP

(57) ABSTRACT

A system including a method employed by a dedicated processor for allocating resources to other processors with a multi-processor computing environment. The dedicated processor is dedicated only to providing resource allocation to the other processors. Specifically, a script file is provided to the dedicated processor, the script containing information related to the resources required by the other processors. The script file is parsed by the dedicated processor to determine the resources required by the second processor. Thereafter, the dedicated processor dynamically allocates the resources and synchronizes resource allocation at the time needed by the other processors.

6 Claims, 2 Drawing Sheets

PREDICTIVE RESOURCE ALLOCATION IN COMPUTING SYSTEMS

COPYRIGHT NOTICE

A portion of the disclosure recited in this application contains material which is subject to copyright protection. Specifically, a "computer program listing appendix" in accordance with 37 CFR Section 1.96 is included that lists source code instructions for a process by which the present invention is practiced in a computer system. The copyright owner has no objection to the facsimile reproduction of the specification as filed in the Patent and Trademark Office. Otherwise all copyright rights are reserved.

BACKGROUND OF THE INVENTION

The present invention relates generally to the field of computer and information processing and more specifically to a system for predictably allocating computing resources within a multi-processor (as opposed to a single processor) computing environment.

Conventional systems for allocating resources are generally known. Resource allocation issues arise in a broad range of industrial and technological areas such as routing of data in communication channels, inventory control and operation management for example. As used herein, resource allocation refers to allocation of memory and other processor resources within a multi-processor computing environment in order to optimize data transfer.

The importance of resource allocation in multi-processor environments cannot be overemphasized. A demand for increased processing power provided by multiple-processor systems currently exists. In parallel computing for example, a plurality of processors are utilized for increased processing power. However, because availability is limited, the plurality of processors must share the limited computing resources. Without resource allocation between the various processors, problems of resource contention and deadlock could arise, virtually shutting down the computing system.

Conventional systems for allocating memory in multi-processor systems are generally known to follow the paradigm in single processor environments. In an IRQ/ISR model for example, resource allocation is reactive. A task requiring a resource must request the resource before it is allocated. By way of example, a program desiring 100 k of memory buffer must typically request the memory from a processor. The request is then granted by the processor in conjunction with a memory controller. Disadvantageously, the processor must stop its current activity to service the request such that a bottleneck for data transfer is created. This static memory allocation scheme may significantly degrade performance in a multi-processor computing environment.

This paradigm makes little or no sense in a multi-processor computing environment where tasks are executed in parallel such that a first process and a second process are run simultaneously by a first and a second processor, respectively. Sometimes the second processor may need to wait for results from the first processor in order to continue processing. At other times however, resource allocation occurs in a manner wherein although the first and second processors are independent of each other, each processor must request and thereafter await receipt of computing resources. Each processor is inhibited from beginning or continuing processing if there are no resources when needed. Only after the computing resources are allocated can further processing continue.

Another disadvantage of conventional systems is that computing resources are typically allocated in advance of execution of the task that requests the computing resource. If memory space is required by the first processor, the memory space is immediately allocated even though it not needed until sometime later. In so far as the memory space is occupied prior to need and after execution, such prior resource allocation is wasteful as the space cannot be allocated to other processes. The memory space is only needed during execution of the program not before or after.

A further disadvantage of conventional multi-processor system is that all of the processors in the system perform resource allocation services. This provides for inefficiency since in addition to other tasks to be performed, each processor is burdened with the responsibility of resource allocation.

Therefore, there is a need to resolve the aforementioned disadvantages specific to multi-processor computing environments and the present invention meets this need.

BRIEF SUMMARY OF THE INVENTION

According to a first aspect of the present invention, a system for allocating computing resources to other processors with a multi-processor computing environment is disclosed. A processor is dedicated to providing resource allocation services to the other processors within the multi-processor computing environment. A script file is provided to the dedicated processor, the script containing information related to the computing resources required by the other processors. Among other information, the script file is parsed by the dedicated processor to determine the resources required by the other processors and when the resources are required. Thereafter, the dedicated processor dynamically allocates the resources at the time needed by the other processors. Because the script file is provided, multiple processes can be synchronized, and each processor knows ahead of time which tasks can be performed without having to wait for another processor. Not only are resources dynamically allocated, resource allocation is synchronized with the time such resources are needed by the other processors.

According to another aspect of the present invention, in a multi-processor computing environment, a method by a first processor for allocating resources for use by a second processor is disclosed. The method includes: (1) providing a script to the first processor, the script containing information related to the resources required by the second processor; (2) parsing the script to determine the resources required by the second processor; and (3) dynamically allocating the resources at the time needed by the second processor.

According to another aspect of the present invention, the script further comprises information related to resources required by a third processor; and dynamically allocates the resources at the time needed by the third processor.

According to another aspect of the present invention, a method by a processor for allocating resources for use by one or more tasks in a multi-processor computing environment is taught. The method includes the following: (1) providing a script to the processor, the script containing a map of sequences that will occur during execution of the one or more tasks; (2) parsing the script to determine resources required based on the map of sequences; and (3) allocating the resources immediately prior to execution of the task.

According to another aspect of the present invention, a predictive resource allocation system for a multi-processor computing environment having two or more processors is disclosed. Among other components, the system includes a first processor; a dedicated processor dedicated to providing resource allocation to the first processor; a script file containing information related to the resources required by the second processor; a script engine for running the script file; the dedicated processor in conjunction with the script engine parses the script file to determine the resources required by the second processor; and the dedicated processor dynamically allocating the resources at the time needed by each processor.

According to another aspect of the present invention, the script further comprises information related to resources required by a third processor; and the dedicated processor dynamically allocating the resources at the time needed by the third processor.

According to another aspect of the present invention, a method by a processor for allocating resources for use by two or more tasks in a multi-processor computing environment is disclosed. The method includes: (1) providing a script to the processor, the script containing a map of sequences that will occur during execution of the tasks; (2) parsing the script to determine the map of sequences for the tasks and to determine the resources required by the tasks; and (3) allocating the resources to the tasks such that resource allocation is synchronized with when the resources are needed by tasks.

Advantageously, unlike conventional multi-processor systems wherein all processors may undertake resource allocation, a dedicated processor is solely dedicated to resource allocation and to the task of parsing and interpreting the contents of the script file. Because a script file is provided, multiple processes can be coordinated, and each processor knows which task can be performed without having to wait for the another processor.

Figure 1:
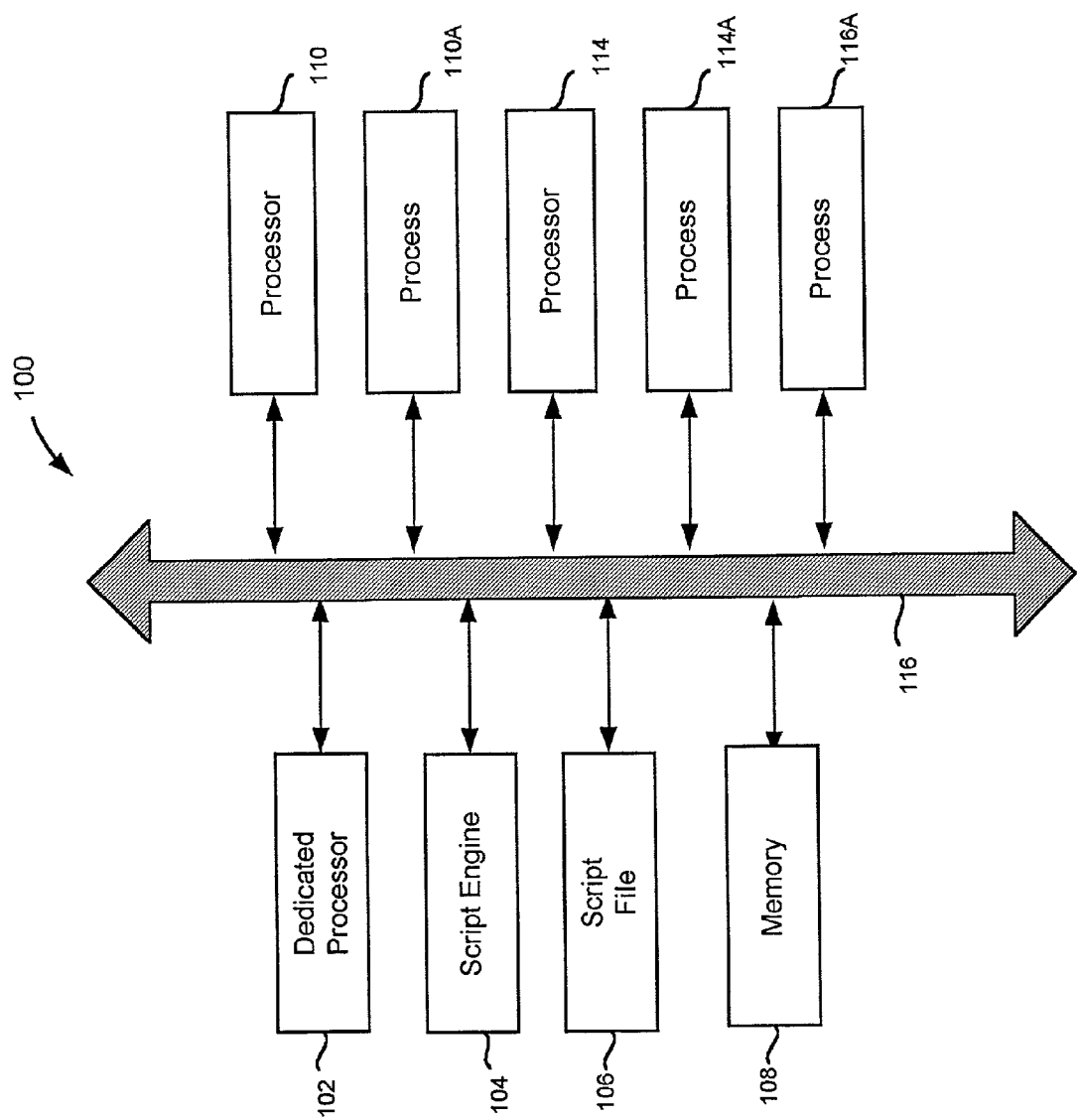
FIG. 1 is a multi-processor environment in which predictive allocation of resources may be employed in accordance with a first embodiment of the present invention.

A further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

FIG. 1 is a multi-processor environment 100 in which predictive allocation of resources may be implemented in accordance with a first embodiment of the present invention.

As implied by its name, multi-processor environment 100 includes, among other components, one or more processors namely a dedicated processor 102 for controlling a script engine 104; the script engine 104 for processing a script file 106; a first processor 110 for executing two processes namely process 110A and process 116A; and a second processor 114 for executing a process 114A. Processes 110A, 114A and 116A are part of a single application for execution within multi-processor environment 100.

Other components of multi-processor environment 100 includes a memory 108 which is an example of a resource which may be allocated and a communication bus 116. Although not shown, one of ordinary skill in the art will realize that various other resources such as matrix configuration, queue length, priority, etc may be allocated as proves necessary according to the precepts and principles of the present invention.

In operation, a programmer wishing to allocate resources related to the application initially provides a script file 106 to dedicated processor 102. Advantageously, unlike conventional multi-processor systems wherein all processors may undertake resource allocation, dedicated processor 102 is solely dedicated to resource allocation and to the task of parsing and interpreting the contents of script file 106. In one embodiment, script file 106 contains a description of the execution sequence of the application and a list of its corresponding resources, when they are required and when such resources are releasable. On parsing script file 106, dedicated processor 102 becomes privy to the execution sequence and list of resources of the application ahead of its execution. In this manner, the present invention, permits assignment of resources ahead of need and releases them when no longer in use. Although not shown, one of ordinary skill in the art will realize that techniques other than a script file for predictably determining the needs of the multiple processors can be employed. For example, an object-oriented data structure may be provided to dedicated processor 102.

By way of example, an exemplary script file 106 is provided below. In FIG. 1, process 110A and process 116A are executed on processor 110 while process 114A is run by processor 114. Process 116A cannot executed until process 114A is completed. Process 110A requires a 100 Kbyte buffer and process 116A requires a 200 Kbyte buffer. Processor 110A can surrender its 100 Kbyte buffer only when process 114A is complete. This allows dedicated processor 102 to reuse the space for processor 116's 200 Kbyte buffer. Script file 106 is as follows:

PROCESS 110A EXECUTES ON PROCESSOR 110; NEEDS: BUFFER 100K REF BB

PROCESS 114A EXECUTES ON PROCESSOR 114

PROCESS 116A EXECUTES ON PROCESSOR 110; WAIT FOR PROCESS 114A; NEEDS BUFFER 200K; FREE BB

Therefore, optimization of memory allocation is decided far in advance of need because dedicated processor 102 possesses a road map for the execution sequence prior to actual execution of the application. It should be observed that actual execution of the application will cause the request for execution of processes 11A, 114A, 116A as well as their requests for buffers. Further, one of ordinary skill in the art will realize that the present invention can be implemented by way of software, hardware e.g. as part of ASIC (application specific integrated circuit) or a combination of both.

According to another embodiment of the present invention, script file 106 is an I/O script having a description of the sequence of I/O operations, resource requirements that will be issued for a given task or thread. For example, the sequence of operations provided for a read sequence may be as follows:

INITIATE READ with—maximum block=2 KB, source device=1, destination=3

READ BLOCK will repeat

CLOSE READ terminates Read sequence

The I/O script does not actually execute the I/O sequence—it informs dedicated processor 102 of future events when the I/O sequence is actually issued so that resources can be assigned when that I/O sequence is activated by the application.

As noted, dedicated processor 102 is solely dedicated to resource allocation and to the task of parsing the contents of script file 106 so it knows in advance the execution sequence of the application. It is for this reason that dedicated processor 102 is able to synchronize exactly when the resources should be allocated. For example, the time to allocate the resource may be 2 milliseconds prior to use by the application. Therefore, in addition to dynamic allocation, the allocation is synchronized for utilization when needed by the other processors. In this manner, the present invention improves overall performance of the multi-processor computing environment.

Figure 2:
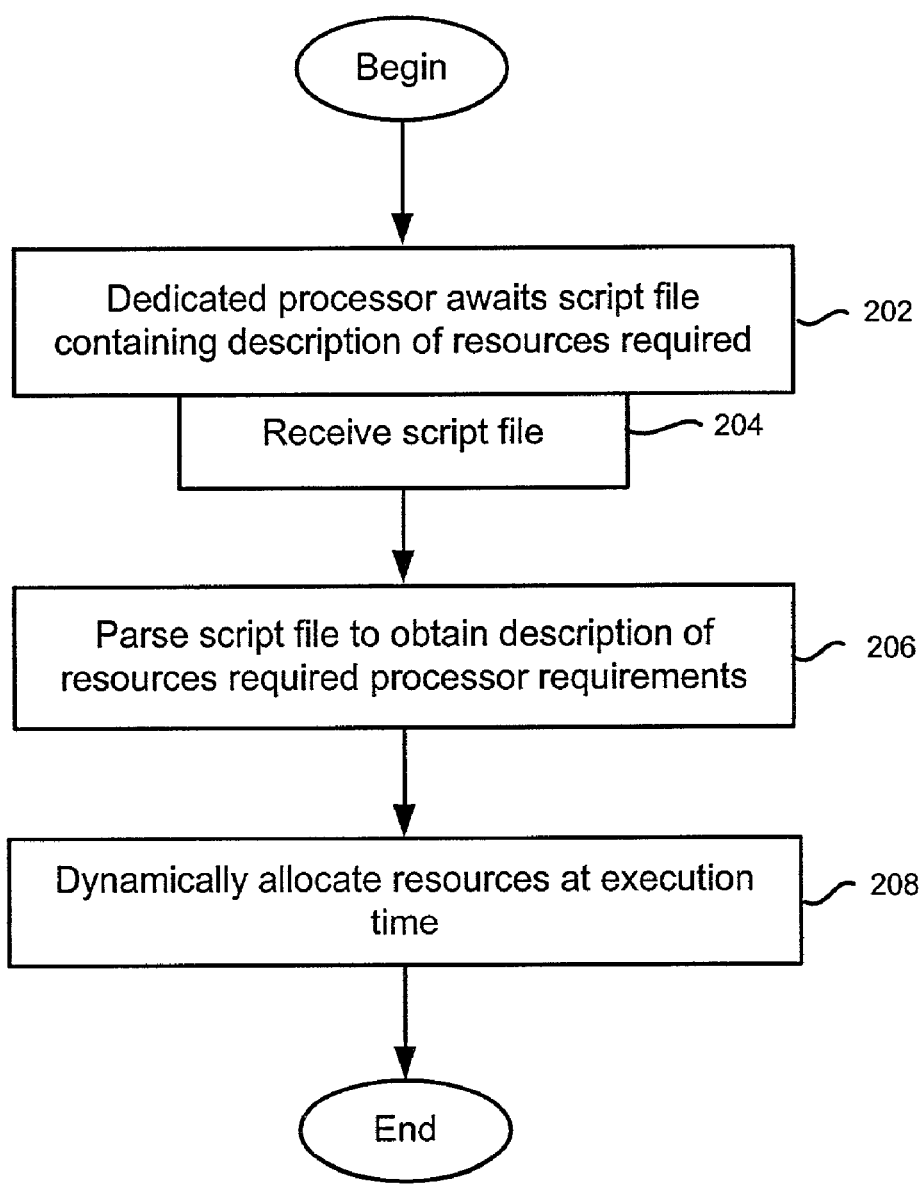
FIG. 2 is a flow chart of a method employed by a dedicated processor for allocating resources for use by other processors within the multi-processor computing environment of FIG. 1 in accordance with one embodiment of the present invention.

FIG. 2 is a flow chart of a method 200 employed by dedicated processor 102 for allocating resources to processors 110 and 114 within multi-processor computing environment 100 of FIG. 1 in accordance with one embodiment of the present invention.

In FIG. 2, at step 202, dedicated processor 102 (FIG. 1) is awaiting the receipt of script file 106. Script file 106 contains information related to the resources required by processors 110 and 114.

At block 204, script file 106 is received by dedicated processor 102.

At block 206, after the script file is received, method 200 comprises parsing by dedicated processor 102, script file 106 to determine the resources required by the processors.

At block 208, the resources are dynamically allocated at the time needed by processors 110 and 114. Because script file 106 is provided, multiple processes can be coordinated, and each processor knows which task can be performed without having to wait for the another processor. Dedicated processor 102 knows the what and when certain resources required by processors 110 and 114. For example, if processor 114 requires some memory, it is assigned while processor 110 is busy so that the memory is ready for processor 114 when needed.

In this fashion, the present invention and its embodiments provide a predictive resource allocation system for a multi-processor computing environment. While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. A method by a processor for allocating resources for executing tasks in an application in a multi-processor computing environment, the method comprising:
    providing a script file to the dedicated processor prior to beginning execution of the application, the dedicated processor being dedicated solely to executing the script file and the allocation of resources to a plurality of other processors, the script file including a map of execution sequences including an execution sequence of one or more tasks for each of the plurality of other processors;
    running and parsing the script file, by the dedicated processor, to determine resources required by each of the plurality of other processors based on the map of execution sequences; and
    dynamically allocating the resources, by the dedicated processor, immediately prior to execution of each of the one or more tasks to achieve the execution of the one or more tasks based on the map of execution sequences included in the script file, wherein resource allocation is synchronized when the resources are needed by the plurality of other processors for the execution of the one or more tasks, and each of the plurality of other processors is configured to determine what tasks can be performed without having to wait to receive information from a different one of the plurality of other processors.

2. The method of claim 1 wherein the script file is an I/O script file.

3. The method of claim 1 wherein each of the plurality of other processors executes multiple tasks as part of a single application.

4. A predictive resource allocation system for a multi-processor computing environment having two or more processors, comprising:
    a plurality of other processors for executing an application;
    a dedicated processor dedicated to providing resource allocation to the plurality of other processors;
    a script file containing information related to the resources required by the plurality of other processors to execute the application including a map of execution sequences including an execution sequence of one or more tasks for each of the plurality of other processors;
    the dedicated processor running the script file and parsing the script file to determine the resources required by the plurality of other processors prior to beginning execution of the application; and
    the dedicated processor dynamically allocating resources prior to execution of each of the one or more tasks to achieve the execution of the one or more tasks based on the map of execution sequences included in the script file, wherein resource allocation is synchronized when the resources are needed by the plurality of other processors for the execution of the application, and each of the plurality of other processors is configured to determine what tasks can be performed without having to wait to receive information from a different one of the plurality of other processors.

5. A method for allocating resources for use by a first processor in execution of an application comprising a plurality of tasks in a multi-processor computing environment, the method comprising:
    providing a script file to the first processor prior to beginning execution of the application, the first processor being dedicated solely to parsing the script and to allocation of resources to a plurality of other processors, the script file containing a map of execution sequences including an execution sequence of tasks for each of the plurality of other processors;
    running and parsing the script file, by the first processor, to determine the execution sequence of the tasks for each of the plurality of other processors to execute the tasks and to determine the resources required by each of the plurality of other processors to execute the tasks; and
    dynamically allocating the resources, by the first processor, to the plurality of other processors for execution of the application by the plurality of other processors based on the map of execution sequences included in the script, wherein resource allocation is synchronized when the resources are needed by the plurality of other processors for the execution of the tasks, and each of the plurality of other processors is configured to determine what tasks can be performed without having to wait to receive information from a different one of the plurality of other processors.

6. The method of claim 5 wherein allocating the resources to the plurality of other processors in the multi-processor environment further comprises dynamically allocating the resources at the time needed for the execution of the tasks.

* * * * *

UNITED STATES PATENT AND TRADEMARK OFFICE
CERTIFICATE OF CORRECTION

PATENT NO. : 7,594,229 B2  Page 1 of 1
APPLICATION NO. : 09/974521
DATED : September 22, 2009
INVENTOR(S) : Hirschsohn It is certified that error appears in the above-identified patent and that said Letters Patent is hereby corrected as shown below:

In column 5, line 45, please replace "by a processor" with -- by a dedicated processor --.

In column 6, line 10, please replace "having two or more processors" with -- having a plurality of processors --.

In column 6, line 13, please replace "dedicated to" with -- dedicated solely to --.

Signed and Sealed this

Twenty-third Day of March, 2010

David J. Kappos
*Director of the United States Patent and Trademark Office*